Patented June 17, 1952

2,600,377

UNITED STATES PATENT OFFICE 2,600,377

PROCESS FOR THE PREPARATION OF SULFONATED COPPER PHTHALOCYANINE DYE

Jonas John Chechak and Charles F. H. Allen, Rochester, N. Y., assignors to Eastman Kodak Company, Rochester, N. Y., a corporation of New Jersey No Drawing. Application August 6, 1948, Serial No. 43,006

2 Claims. (Cl. 260—314.5)

This application relates to a method for sulfonating copper phthalocyanine dyes. The sulfonation of copper phthalocyanine for use in the textile and related industries is not new. Sulfonation is generally accomplished by treating copper phthalocyanine with oleum of various strengths. The structure of copper phthalocyanine as deduced by Linstead is as follows:

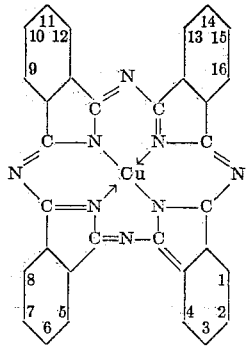

It is seen that 16 hydrogen atoms are subject to replacement by sulfonic acid and since the directive effect in each of the benzene rings may vary, a number of isomers with one sulfonic acid group in each ring is possible. When copper phthalocyanine is sulfonated with oleum, a mixture of at least two dyes is obtained, one having a maximum absorption at 615 millimicrons and the other a maximum absortion at 668 millimicrons. These fractions can be separated by means of a tedious alcohol precipitation.

The sulfonated copper phthalocyanine dyes are useful in the imbibition process of color photography. In this process a relief image is formed, usually in gelatin and the relief image is dyed with a dye which can be transferred to a mordanted gelatin blank to form a dye image in the blank. For this process, the dye should be one which transfers quickly and completely from the relief image to the mordanted blank. We have found that the sulfonated copper phthalocyanine dye having an absorption maximum at 615 millimicrons does not transfer quickly nor completely while the 668 millimicron component transfers rapidly and completely.

It is therefore an object of our invention to provide a method for preparing in high yield a sulfonated copper phthalocyanine dye having an absorption maximum at 668 millimicrons. A further object is to provide a dye which is useful in the imbibition process of color photography. Other objects will appear from the following description of our invention.

These objects are accomplished by treating copper phthalocyanine with oleum of approximately 15% strength under the conditions specified below.

To prepare our dye, copper phthalocyanine is added to about 10 times its weight of 15% oleum at 170° C. to 175° C. and about 4% of the weight of copper phthalocyanine of mercuric sulfate is then added to the mixture. The mixture is heated at 170° C. to 175° C. for about two hours, cooled and diluted with 15 to 20 times its volume of water. It is then brought to about pH 8 with 40% sodium hydroxide solution after which it is brought to pH 5 with glacial acetic acid and cooled to about 30° C. An excess of triphenyl guanidine in solution in hot ethyl alcohol, glacial acetic acid and water is then added to precipitate the dye as the guanidine salt and this is stirred for 10 or 15 minutes and filtered. The guanidine salt of the dye is washed on the filter with a large amount of cool water at 20 to 30° C., pressed as dry as possible and redissolved in boiling ethyl alcohol. This solution is filtered to remove any impurities and heated to about 70° C. An excess of anhydrous sodium acetate is stirred into the solution and the dye is thrown down as the sodium salt from the alcohol solution of the guanidine salt. The dye is recovered from the solution as the sodium salt of the sulfonated copper phthalocyanine.

The sulfonation temperature must be held within the limits of 170 to 175° C. Too low temperature results in incomplete sulfonation with a considerable amount of the 615 millimicron component appearing while too high a temperature results in excessive restruction of the dye, yielding a colorless material.

We also believe that although some of the 615 millimicron component is produced during the sulfonation, there is selective destruction of the sulfonated copper phthalocyanine under the conditions of the reaction. It happens that the 615 millimicron component is destroyed almost as quickly as it is formed, while the 668 millimicron dye is sufficiently resistant that it is not affected under the conditions of preparation. If, however, the temperature is allowed to rise much above 175° C. or if the time of operation is extended appreciably beyond the two hours specified more and more of the 668 millimicron dye is destroyed until finally no dye remains.

Our method of sulfonation will be further illustrated by reference to the following specific example.

In a flask there was placed 675 cc. of 15% oleum and after heating it to a temperature of from 170 to 175° C., 75 grams of copper phthalocyanine was added in small portions with stirring, keeping the temperature below 175° C. A three-gram portion of mercuric sulfate was then added as a catalyst and heating continued with stirring at 170 to 175° C. for two hours.

The mixture was cooled rapidly, and dumped into 7.5 kilograms of crushed ice and diluted to about 12 liters with water. A 40% aqueous solution of sodium hydroxide was then added in small portions until the pH was brought to 8. The solution was then brought to pH 5 with glacial acetic acid and cooled to 30° C.

A solution of 180 grams of triphenyl guanidine in 1.5 liters of hot ethyl alcohol, 360 cc. of glacial acetic acid and 350 cc. of water was then added while stirring to the dye solution. The dye was precipitated as the guanidine salt as a coarse powder and after stirring for 10 or 15 minutes was filtered. The precipitate was washed with about 25 liters of cool water at 20 to 30° C. It was pressed as dry as possible and redissolved in 6 liters of boiling ethyl alcohol and again filtered. The solution was heated to about 70° C. and 75 grams of anhydrous sodium acetate was stirred into it. The dye was thrown down as the sodium salt from the alcohol solution of the guanidine salt. After 10 or 15 minutes it was filtered and pressed dry. The sodium salt was again extracted with 6 liters of boiling ethyl alcohol, filtered and dried. The yield was about 90 grams of the sulfonated copper phthalocyanine dye. A 1 to 50,000 solution of the dye in 0.02 molar sodium bicarbonate solution gave a density of 1.5 at a 668 millimicron absorption maximum in a 1 centimeter cell.

As stated above, several isomers of the sulfonated copper phthalocyanine are possible. When tetrasulfonated copper phthalocyanine is prepared by condensing 4-sulfophthalimide the 615 m$\mu$ dye is produced exclusively. This would correspond to the 2,6,10,14 or 3,7,11,15 tetrasulfo copper phthalocyanine which may or may not be the same dye depending upon their behavior in resonance.

When sulfonation of the copper phthalocyanine is done with chlorosulfonic acid at 615 m$\mu$ dye is produced almost exclusively.

If we consider the 1,5,9,13 or 4,8,12,16 tetrasulfo copper phthalocyanines, which again may or may not be the same dye depending upon their behavior in resonance, we can look upon them as being derived from 3-sulfophthalimide. Also since the product of our reaction is quite different from the 615 m$\mu$ dye we assume that our dye is probably represented by the 1,5,9,13 or 4,8,12,16 configuration, since these could be the only other possibilities.

It will be understood that modifications may be made in our process within the scope of the appended claims.

We claim:
1. The method of making a sulfonated copper phthalocyanine dye, which comprises treating copper phthalocyanine for about two hours with an excess of 15% oleum at 170° to 175° C. in the presence of mercuric sulfate catalyst, cooling and diluting the reaction mixture with water, bringing the mixture to pH about 8, reducing the pH of the mixture to about 5 with acetic acid, cooling the mixture to about 30° C., adding an excess of triphenyl guanidine in hot aqueous alcoholic acetic acid solution to form a guanidine salt of the dye, removing said guanidine salt and dissolving it in ethyl alcohol, then precipitating the sodium salt of the sulfonated copper phthalocyanine from solution.

2. The method of making a sulfonated copper phthalocyanine dye, which comprises adding copper phthalocyanine to about 10 times its weight of 15% oleum at 170° to 175° C., adding to the mixture about 4% of the weight of copper phthalocyanine of mercuric sulfate, heating the mixture at 170–175° C. for about two hours, cooling and diluting with 15 to 20 times the volume of water, adding 40% sodium hydroxide solution until the pH becomes about 8, bringing the solution acid to pH 5 with acetic acid, cooling to about 30° C., adding an excess of triphenyl guanidine in hot aqueous alcoholic acetic acid solution to form a guanidine salt, filtering the guanidine salt of the dye and washing with water, redissolving in hot ethyl alcohol and heating the solution to about 70° C., adding an excess of anhydrous sodium acetate to the solution to precipitate the sulfonated copper phthalocyanine as the sodium salt and recovering the sodium salt from the solution.

JONAS JOHN CHECHAK.
CHARLES F. H. ALLEN.

REFERENCES CITED

The following references are of record in the file of this patent:

UNITED STATES PATENTS

| Number | Name | Date |
|---|---|---|
| 2,153,740 | Carleton et al. | Apr. 11, 1939 |
| 2,180,409 | Frankenburger et al. | Nov. 21, 1939 |
| 2,276,918 | Bienert | Mar. 17, 1942 |
| 2,278,973 | Carr | Apr. 7, 1942 |

FOREIGN PATENTS

| Number | Country | Date |
|---|---|---|
| 488,555 | Great Britain | July 5, 1938 |

OTHER REFERENCES

Groggins: "Unit Processes in Organic Synthesis," 2nd ed., pp. 270–274 (1938), McGraw-Hill, N. Y.